United States Patent [19] [11] 4,327,762
Scott et al. [45] May 4, 1982

[54] CONTROL DEVICE AND METHOD OF MAKING THE SAME

[75] Inventors: Douglas R. Scott; Larry V. Price, both of Knoxville, Tenn.

[73] Assignee: Robertshaw Controls Company, Richmond, Va.

[21] Appl. No.: 176,453

[22] Filed: Aug. 8, 1980

Related U.S. Application Data

[62] Division of Ser. No. 39,792, May 17, 1979, Pat. No. 4,290,441.

[51] Int. Cl.$^3$ .......... G05D 16/00
[52] U.S. Cl. .......... 137/85; 137/271
[58] Field of Search .......... 137/84, 85, 86, 269, 137/270, 271

[56] References Cited

U.S. PATENT DOCUMENTS 3,262,463 7/1966 Granada .......... 137/85
3,707,980 1/1973 Bergamini .......... 137/84
3,908,685 9/1975 Caldwell .......... 137/84

*Primary Examiner*—Alan Cohan
*Attorney, Agent, or Firm*—Candor, Candor & Tassone

[57] ABSTRACT

A control device having a housing provided with a main lever pivotally mounted thereto by a pivot structure and being operatively associated with a flapper to move the same relative to a leakport in relation to pivotal movement of the main lever. The device has a feedback diaphragm operatively associated with a feedback lever that is pivotally mounted to the housing and is operatively associated with the main lever to cause pivoting thereof upon pivoting movement of the feedback lever by the feedback diaphragm. The device has means for selectively changing the device to be either direct acting or reverse acting by changing the position of the feedback lever and the flapper and without changing the position of the feedback diaphragm and the leakport.

5 Claims, 13 Drawing Figures

CONTROL DEVICE AND METHOD OF MAKING THE SAME

CROSS-REFERENCE TO RELATED APPLICATION

This application is a divisional patent application of its copending parent patent application, Ser. No. 039,792, filed May 17, 1979, now U.S. Pat. No. 4,290,441.

BACKGROUND OF THE INVENTION

1. Field of the Invention

This invention relates to an improved control device of the pneumatically operated receiver-controller type and to the method of making the same.

2. Prior Art Statement

It is known to provide a control device having a housing means provided with a main lever pivotally mounted thereto by a pivot means and being operatively associated with a flapper to move the same relative to a leakport means in relation to pivoted movement of the main lever, the device having a feedback diaphragm operatively associated with a feedback lever that is pivotally mounted to the housing means and operatively associated with the main lever to cause pivoting thereof upon pivoting movement of the feedback lever by the feedback diaphragm.

For example, see the following item:

(1) U.S. Pat. No. 3,908,685—Caldwell.

It appears that the control device of item (1) above does not have the feedback diaphragm thereof and the leakport means thereof disposed in the same plane as the pivot means for the main lever thereof and does not have means for selectively changing the same from a direct acting control device to a reverse acting control device by changing the position of the feedback lever and the flapper and without changing the position of the feedback diaphragm and the leakport means. Further, the control device of item (1) above does not have a diverter valve means forming a part thereof for diverting the fluid flow path from one of the inlets thereof.

SUMMARY OF THE INVENTION

It is one feature of this invention to provide a control device of the receiver-controller type which can be selectively changed so as to be either direct acting or reverse acting.

In particular, one embodiment of this invention provides such a control device wherein the pivot means for the main lever, the leakport means and the feedback diaphragm respectively have centerlines that are all disposed substantially in the same plane.

It is another feature of this invention to provide such a control device wherein the same has means for adjusting the internal flow paths thereof so that the control device can act as a limit to the branch signal from another control unit.

In particular, one embodiment of this invention provides a control device having a housing means provided with a main lever pivotally mounted thereto by a pivot means and being operatively associated with a flapper to move the same relative to a leakport means in relation to pivotal movement of the main lever caused by the movement of one or more main diaphragms operatively associated with the main lever, the device having a feedback diaphragm operatively associated with a feedback lever that is pivotally mounted to the housing means and operatively associated with the main lever to cause pivoting thereof upon pivoting movement of the feedback lever by the feedback diaphragm. The housing means has a plurality of inlet means respectively leading by fluid flow paths in the housing means to the diaphragms. A diverter valve means is carried by the housing means for selectively diverting the fluid flow path from one of the inlets that normally leads to one of the diaphragms to the leakport means whereby the control device can act as a control to the branch signal from another control unit that is to be interconnected to another of the inlets.

Accordingly, it is an object of this invention to provide an improved control device having one or more of the novel features of this invention as set forth above or hereinafter shown or described.

Another object of this invention is to provide a method of making such a control device or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
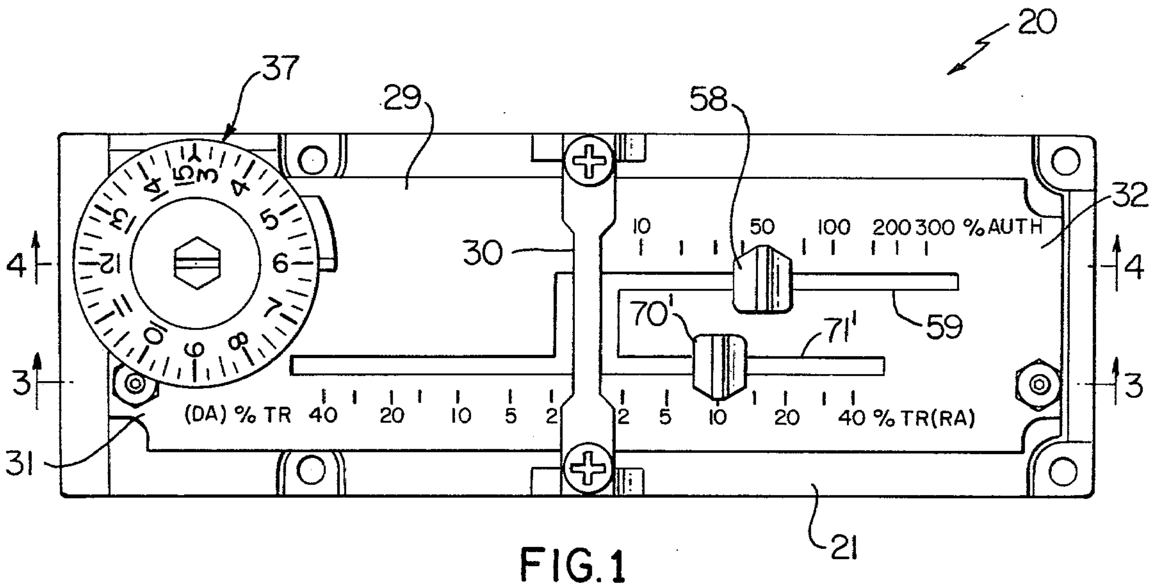
FIG. 1 is a top view of the improved control device of this invention, the control device of FIG. 1 being set in its reverse acting condition.
Figure 2:
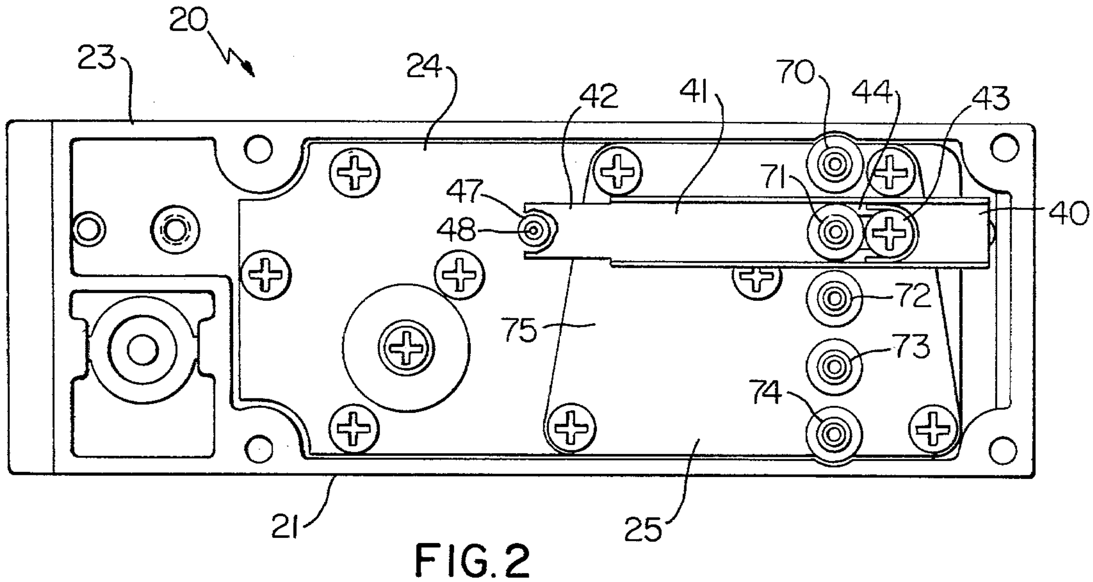
FIG. 2 is a bottom view of the control device of FIG. 1.

While the various features of this invention are hereinafter described and illustrated as being particularly adapted to provide a control device of the pneumatically operated receiver-controller type, it is to be understood that the various features of this invention can be utilized singly or in any combination thereof to provide a control device for any desired purpose.

Therefore, this invention is not to be limited to only the embodiment illustrated in the drawings, because the drawings are merely utilized to illustrate one of the wide variety of uses of this invention.

Referring now to FIGS. 1–5, the improved control device of this invention is generally indicated by the reference numeral 20 and comprises a housing means 21 formed from a plurality of plate-like parts 22, 23, 24 and 25 disposed in stacked relation and having suitable sealing members or flexible diaphragms 26, 27 and 28 disposed therebetween, all of the housing parts and sealing members being secured together by a plurality of fastening means as illustrated.

Since the control device 20 and the majority of parts thereof are substantially the the same as the control device fully illustrated and described in the aforementioned U.S. Patent to Caldwell, U.S. Pat. No. 3,908,685, such patent is incorporated herein by reference as the particular details of the parts of the control device 20 of this invention and how such parts are made and assembled together can be obtained from such patent and need not be repeated here.

However, the features of this invention which makes the control device 20 of this invention an improvement over the control device of the aforementioned patent will be described hereinafter after a general discussion of the parts and operation of the main components of the control device 20 has been made in order for a person skilled in the art to fully understand the improved features of this invention.

Figure 4:
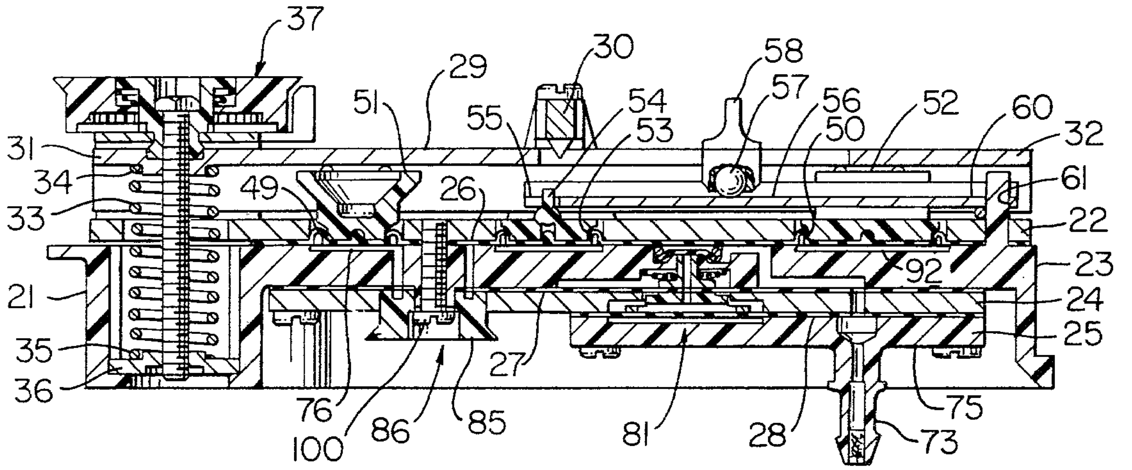
FIG. 4 is a cross-sectional view taken on line 4—4 of FIG. 1.
Figure 12:
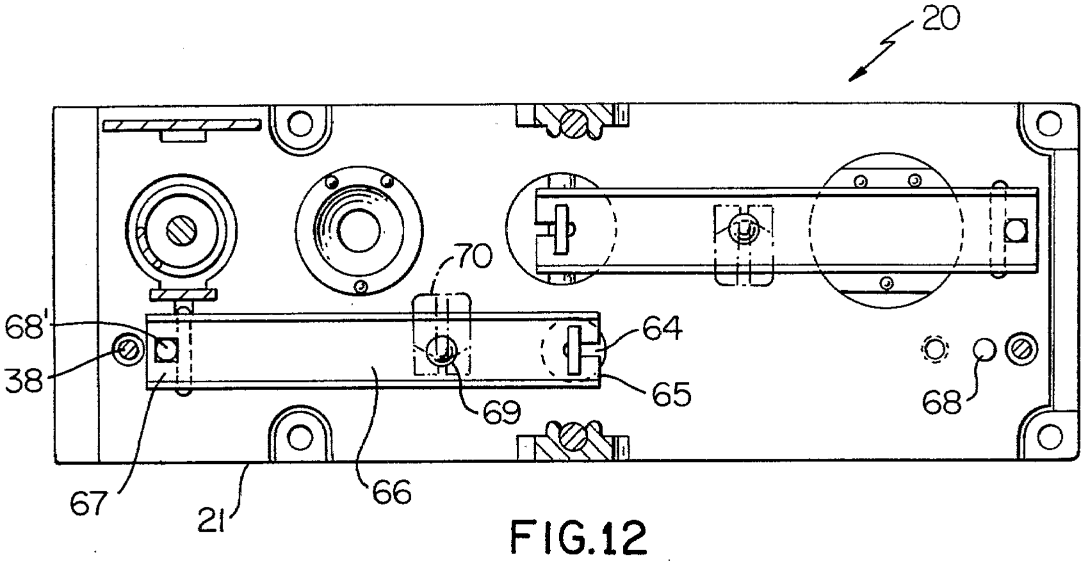
FIG. 12 is a top view of the control device of FIG. 8 with the main lever removed and, thus, is substantially a cross-sectional view taken on line 12—12 of FIG. 10.
Figure 5:
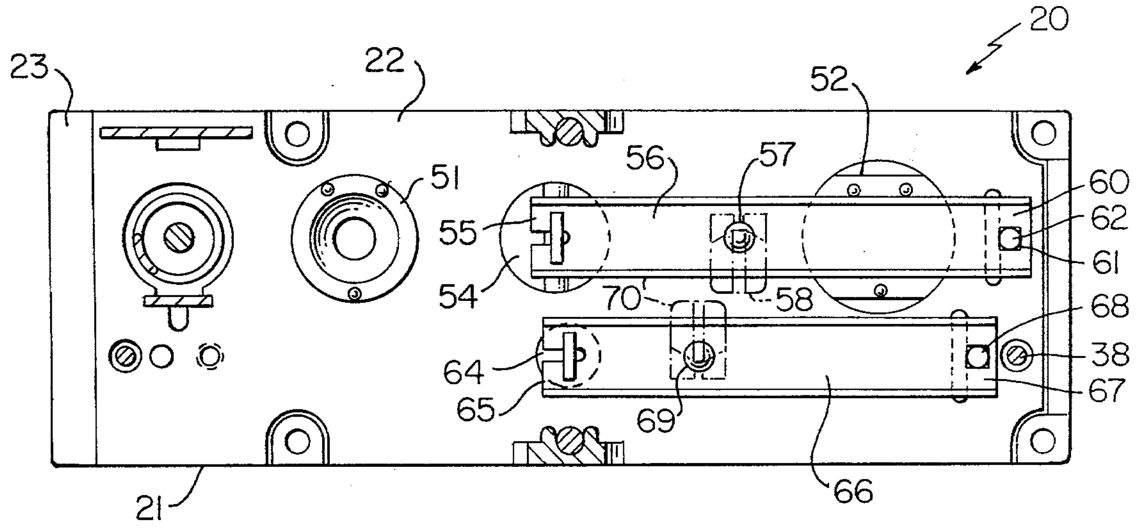
FIG. 5 is a top view of the control device of FIG. 1 with the main lever removed and, thus, is substantially a cross-sectional view taken on line 5—5 of FIG. 3.
Figure 6:
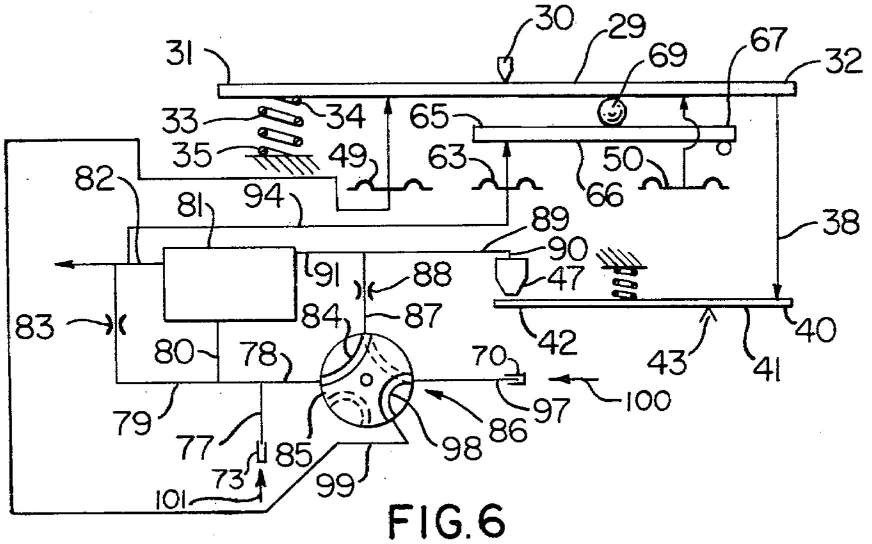
FIG. 6 is a schematic view illustrating the control device of FIG. 1 set in the reverse acting condition thereof.

For example, it can be seen in FIGS. 4 and 6 that the control device 20 has a main lever 29 pivotally mounted to the housing means 21 by a transversely disposed pivot means 30 carried by the housing means 21 and engaging the main lever 29 intermediate the opposed ends 31 and 32 thereof.

The main lever 29 is normally biased to tend to pivot about the pivot means 30 in a clockwise direction in FIG. 4 by a compression spring 33 having one end 34 bearing against the end 31 of the lever 29 and the other end 35 bearing against a spring retainer 36 carried by the housing means 21, the force of the compression spring 33 being adjustable through rotation of a control knob means 37 in substantially the same manner and for the same purpose as set forth in the aforementioned patent to Caldwell.

Figure 3:
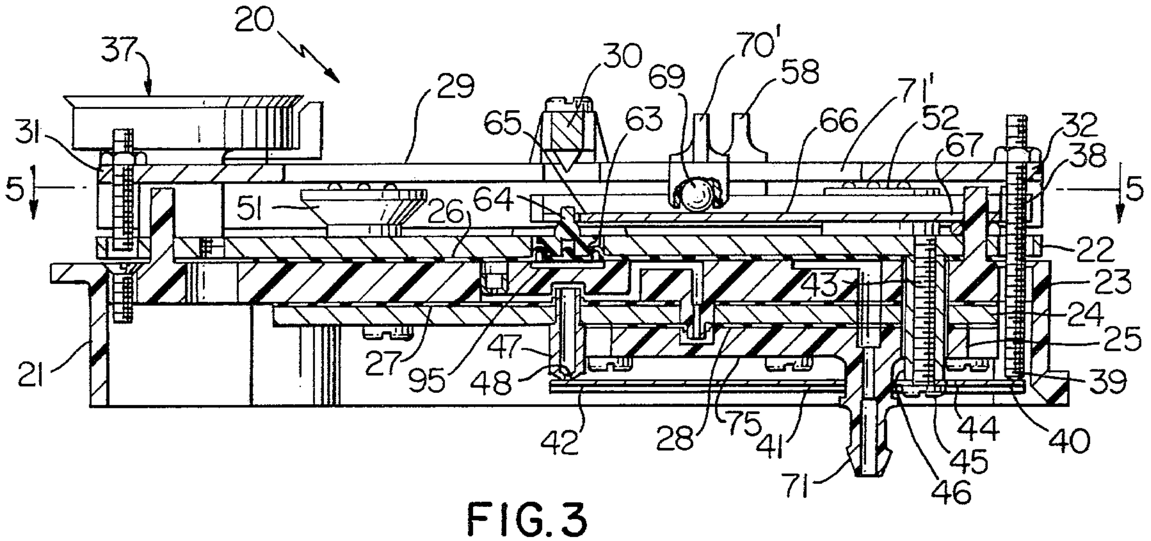
FIG. 3 is a cross-sectional view taken on line 3—3 of FIG. 1.

As illustrated in FIG. 3, the other end 32 of the main lever 29 carries a threaded stem 38 which has its free end 39 bearing against an end 40 of a flapper 41 supported intermediate its ends 40 and 42 by a threaded fastening member 43 that holds an intermediate portion 44 of the flapper 41 between the enlarged head 45 of the fastening member 43 and a tubular spacer 46 secured to the housing means 21 by the fastening member 43.

The flapper 41 has a normal bias to tend to move the end 42 away from leakport means 47 carried by the housing means 21 and utilized in a manner hereinafter described.

Thus, it can be seen that as the main lever 29 is caused to pivot in a clockwise direction in FIG. 3, the same tends to move the end 40 of the flapper 41 downwardly to tend to move the flapper 41 in a clockwise direction about the fastening member 43 so that the end 42 of the flapper 41 will be urged closer to the leakport means 47 to reduce the fluid leakage out of the leakport 48 thereof. Conversely, counterclockwise pivoting of the main lever 29 about the pivot means 30 in FIG. 4 permits the end 40 of the flapper 41 to tend to move upwardly in FIG. 3 and and thereby permits the natural bias of the flapper 41 to move the end 42 thereof in a direction away from the leakport means 47 to permit an increase in the bleed of fluid out of the leakport 48 for a purpose hereinafter set forth.

The flexible sealing member 26 of the housing means 11 is so formed that the same cooperates with the housing section 23 to define two main movable diaphragms 49 and 50 respectively being operatively interconnected to the main lever 29 by interposed abutment members 51 and 52 so that upward movement of the diaphragm 49 in FIG. 4 tends to pivot the main lever 49 in a clockwise direction about the pivot means 30 whereas upward movement of the diaphragm 50 in FIG. 4 tends to move the main lever 29 in a counterclockwise direction about the pivot means 30.

The sealing member 26 additionally cooperates with the housing means 21 to define another movable diaphragm 53 that is operatively interconnected by an interposed abutment member 54 to one end 55 of a lever 56 adjustably pivoted to the housing means 21 and bearing against a ball abutment member 57 positionable in the housing means 21 by an interconnected slide member 58 adapted to be selectively moved within a slot portion 59, FIG. 1, of the main lever 29 so that the moment arm for the lever 56 acting against the main lever 29 can be selected as will be apparent hereinafter. The other end 60 of the lever 56 has an opening 61 therethrough which receives a post means 62 of the housing means 21 to pivotally mount the lever 56 for up and down movement of the lever 56 and its pivot end 61 upon movement of the diaphragm 53 and, thereby, imposing a force on the main lever 29 to the right of the pivot means 30 in FIG. 4. In this manner, the lever 56 tends to cause the counterclockwise movement of the lever 29 upon upward movement of the diaphragm 53 or clockwise movement of the lever 29 upon downward movement of the diaphragm 53, the adjustable abutment means 57 determining the moment arm of the lever 56 acting against the main lever 29 as will be apparent hereinafter.

As illustrated in FIG. 3, the flexible sealing member 26 also defines a diaphragm 63, which acts as a feedback diaphragm as will be apparent hereinafter, the feedback diaphragm 63 carrying an abutment means 64 that is operatively interconnected to an end 65 of a feedback lever 66 that has its other end 67 pivotally carried on a post means 68 of the housing means 21 in a manner similar to the previously described lever 55 and is operatively interconnected to the main lever 29 by an adjustable abutment means that comprises a ball 69 and slide member 70' that is adapted to be selectively positioned within a slot portion 71' of the main lever 29 as illustrated in FIG. 1.

Figure 7:
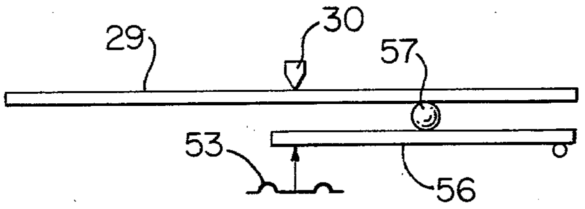
FIG. 7 is a schematic view of the control device of FIG. 6 and illustrates another lever thereof.
Figure 13:
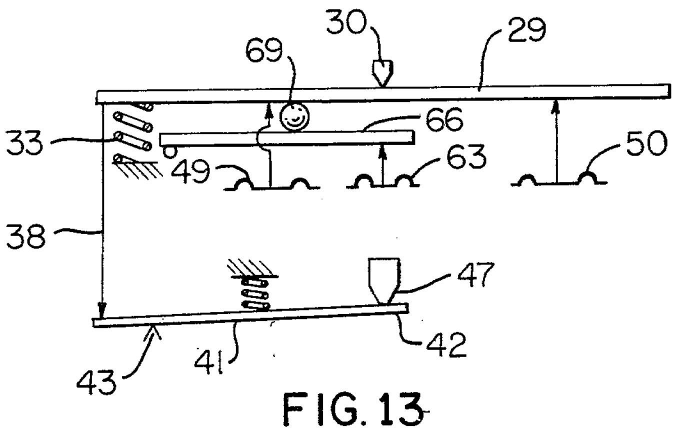
FIG. 13 is a schematic view of the control device of FIG. 8 set in its direct acting condition.

As illustrated in FIG. 3, it can be seen that the centerline for the pivot means 30 for the main lever 29, the centerline of the feedback diaphragm 63 and the centerline of the leakport means 47 are all disposed substantially in a single vertical plane that is disposed substantially transverse to the main lever 29, such unique arrangement permitting the control device 20 of this invention to be selectively changed from the reverse acting condition thereof as illustrated in FIGS. 6 and 7, as well as in FIGS. 1–5, to a direct acting condition as schematically illustrated in FIG. 13, as well as in FIGS. 8–12 as will be apparent hereinafter.

Thus, from FIGS. 3 and 4, as well as FIGS. 6 and 7, it can be seen that when a fluid force or signal is imposed upon the diaphragm 49 to urge the same upwardly in the drawings, the diaphragm 49 tends to pivot the lever 29 in a clockwise direction to cause the flapper 41 to move closer to the leakport 47 to close the leakport 48 thereof. Conversely, a fluid force tending to move the main diaphragm 50 upwardly in the drawings, tends to pivot the lever 29 in a counterclockwise direction about the pivot point 30 and, thus, tends to permit the flapper 41 to open the leakport means 47.

Similarly, upward movement of the diaphragm 53 in the drawings causes the lever 56 to pivot clockwise and thereby tend to cause the main lever 29 to be moved in a counterclockwise direction so as to tend to move the flapper 41 away from the leakport means 47.

Likewise, movement of the feedback diaphragm 63 upwardly in the drawings for the control device 20 of FIGS. 3 and 6 causes the feedback lever 66 to pivot in a clockwise direction and thereby tend to cause the main lever 29 to pivot in a counterclockwise direction and thereby tend to cause the flapper 41 to increase the bleed through the leakport 47 by having the end 42 thereof moved away from the leakport means 47 in the manner previously described.

The housing means 11 is provided with internal passages therein in a manner fully set forth in the aforementioned U.S. patent to Caldwell, U.S. Pat. No. 3,908,685, whereby it can be seen in FIG. 2 that a plurality of inlet nipples 70, 71, 72, 73 and 74 are disposed in aligned relation and extend outwardly from the bottom surface 75 of the housing means 21.

The inlet 70 is fluidly interconnected by a fluid flow path to the signal chamber 76 that is defined by the main diaphragm 49 whereby the inlet 70 can be interconnected to a suitable fluid pressure signal source that is indicated by the arrow 100 in FIG. 6.

The inlet 73 is considered the main inlet for the control device 20 and is adapted to be interconnected to the main source of fluid pressure that is schematically illustrated by the arrow 101 and the inlet line 77 in FIG. 6, the nipple 73 leading to a pair of internal branch fluid flow passages 78 and 79 as illustrated in FIG. 6 with the branch passage 79 being interconnected by another branch passage 80 to a booster relay means 81 that is schematically illustrated in FIG. 6 and is generally indicated by the reference numeral 81 in FIG. 4.

The branch output of the booster relay 81 is directed by a fluid flow path 82 in FIG. 6 to the nipple 74 which is thus, the branch nipple for the control device 20. The branch passage 79 of FIG. 6 is also interconnected by a restricter 83 to the flow path 82 for the branch output before the branch fluid reaches the nipple 74 for a purpose well known in the art.

The other branch 78 of the flow path that is interconnected to the inlet 77 as illustrated in FIG. 6 is normally conveyed by a groove means 84 in a valve disc 85 of a diverter valve means of this invention that is generally indicated by the reference numeral 86 in FIG. 6 as well as by the reference numeral 86 in FIG. 4. The groove 84 of the valve disc 85 normally interconnects the branch 78 of the main 77 to another branch flow path 87 that has a restricter 88 therein and leads to a fluid flow path 89 that has one end 90 disposed in fluid communication with leakport means 47 while the other end 91 thereof is interconnected to a signal chamber of the relay 81.

In this manner, the booster relay means 81 has the force of the pressure fluid in the signal chamber thereof changed by the amount of bleed permitted at the leakport means 47 by the flapper 41 and produces an output signal in the branch line 82 corresponding to the force of the signal in the signal chamber of the relay means 81 in a manner well known in the art for the operation of a booster relay means.

The inlet nipple 72 is adapted to direct a pneumatic signal force to a chamber 92 that provides the fluid force to the main diaphragm 50 that acts on the main lever 29 to the right of the pivot means 30 whereby the nipple 72 is adapted to be interconnected to the desired main fluid pressure signal source.

The nipple 71 is adapted to be interconnected by an internal flow path means to a chamber 93 that provides the fluid force for the diaphragm 53 that acts on the intermediate lever 55 to the right of the pivot means 30 for the main lever 29 whereby the nipple 71 is adapted to be interconnected to the desired fluid pressure signal source.

As illustrated in FIG. 6 an internal flow passage 94 leads to a chamber 95 that forms the fluid source for acting on the feedback diaphragm 63 which, in the condition of FIG. 3, acts through the feedback lever 55 to the right of the pivot means 30 for the main lever 29, the flow passage being interconnected to the branch output passage 82.

As illustrated in FIG. 6, the flow path between the nipple 70 and the chamber 76 for the main diaphragm 49 has a first portion 97 that leads from the nipple 70 to a groove 98 in the valve disc 85 of the diverter valve means 86 so that the groove 98 will normally interconnect the fluid flow path portion 97 to another fluid flow path portion 99 of the flow path that leads to the chamber 76.

In this manner, as long as the valve disc 85 is disposed in the normal position illustrated in full lines in FIG. 6, the nipple 70 is interconnected to the chamber 76 for the diaphragm 49 and the branch portion 78 of the main fluid flow 77 is interconnected by the groove 84 to the branch flow path 87.

However, the selector disc 85 can be rotated to the dotted line position illustrated in FIG. 6 to completely block the branch flow path 78 of the main 77 from the branch flow path 87 while the groove 84 will interconnect the flow path portion 97 leading from the inlet nipple 70 to the flow path portion 87 for a purpose hereinafter described so that no fluid flow will be directed to the chamber 76 of the control device 20 when the valve disc 85 is set in a dashed position illustrated in FIG. 7 for a purpose hereinafter described.

The valve disc 85 is adapted to be rotated to either the full line position of FIG. 6 or the dashed line position thereof merely by loosening a fastening member 100, FIG. 4, and rotating the valve disc 85 which has suitable locating means thereon so that the same can only be set in the two positions illustrated in FIG. 6 and when set in one of the desired positions of FIG. 6, the fastening member 100 can be retightened to hold the valve disc 85 in the selected position thereof.

The operation of the control device 20 in its reverse acting condition as illustrated in FIGS. 1–7 will now be described.

Assuming that the control device 20 is in balance so that the flapper 41 has its end 42 held constant relative to the leakport 47 so that the leakport 47 will cause a constant pressure signal in the signal chamber of the booster relay 81 whereby the booster relay 81 will provide a constant output at the branch path 82. An increase in the value of the pneumatic signal being directed to the main chamber 92 of the control device 20 from a signal source interconnected to the nipple 72 will cause the diaphragm 50 to move upwardly in FIG. 4 and thereby cause the main lever 29 to pivot in a counterclockwise direction in FIGS. 3 and 4 and thereby permit the end 42 of the flapper 41 to move further away from the leakport means 47 and thereby reduce the value of the signal in the signal chamber of the booster relay 81 which, in a conventional manner, will likewise reduce the value of the branch signal being directed by the booster relay means 81 to the branch path 82 and, thus, to the desired device fluidly interconnected to the nipple 74. This change in the value of the branch output pressure of the control device 20 is transmitted by the fluid flow path 94 to the chamber 95 of the feedback diaphragm 63 which reduces the force acting on the feedback lever 66 that is tending to pivot the main lever 29 in a counterclockwise direction so that the force of the compression spring 33 and diaphragm 49 can now pivot the lever 29 back in a clockwise direction about the pivot point 30 because of the reduced pressure in the feedback chamber 95 to place the main lever 29 back into its balanced condition and, thus, again balance the flapper 41 relative to the leakport means 47 to thereby tend to increase the signal in the signal chamber of the booster relay 81 and, thus, tend to increase the value of the branch signal being directed by the booster relay 81 to the branch flow path 82.

Conversely, a decrease in the force of the signal being directed to the chamber 92 of the control device 20, or an increase in the force of the signal being directed to the main chamber 76 for the diaphragm 49, will cause the main lever 29 to pivot in a clockwise direction in FIGS. 3 and 4 and thereby tend to move the end 42 of the flapper 41 closer to the leakport means 47 and thereby tend to increase the value of the signal in the signal chamber of the booster relay means 81 which correspondingly increases the value of the branch signal being directed to the branch 82. However, this increase in the pressure value of the fluid at the branch 82 is sensed by the feedback chamber 95 and thereby causes the feedback diaphragm 63 to move upwardly and through the adjustable abutment means 69, 70′ tends to pivot the main lever 29 back in a counterclockwise direction to tend to place the control device 20 in the previous balanced relation thereof.

As previously stated, the arrangement of the parts of the control device 20 of this invention readily permits the same to be changed from the reverse acting condition thereof previously described to a direct acting condition thereof.

In particular, by merely changing the position of the flapper 41 and the feedback lever 66 from both being disposed to the right of the pivot means 30 of the main lever 29 to both being disposed to the left of the pivot means 30 as illustrated in FIGS. 8–13, the control device 20 can be a direct acting control device.

Figure 10:
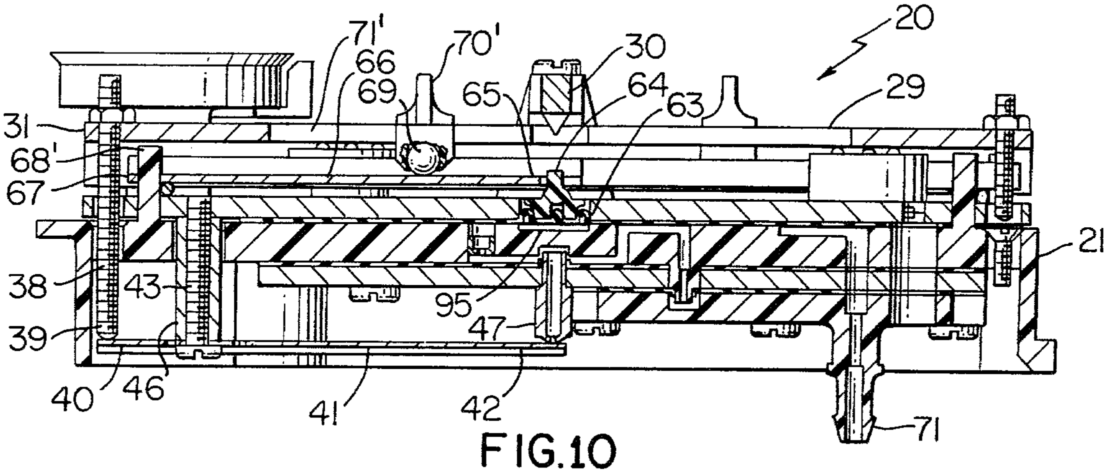
FIG. 10 is a cross-sectional view taken on line 10—10 of FIG. 8.
Figure 11:
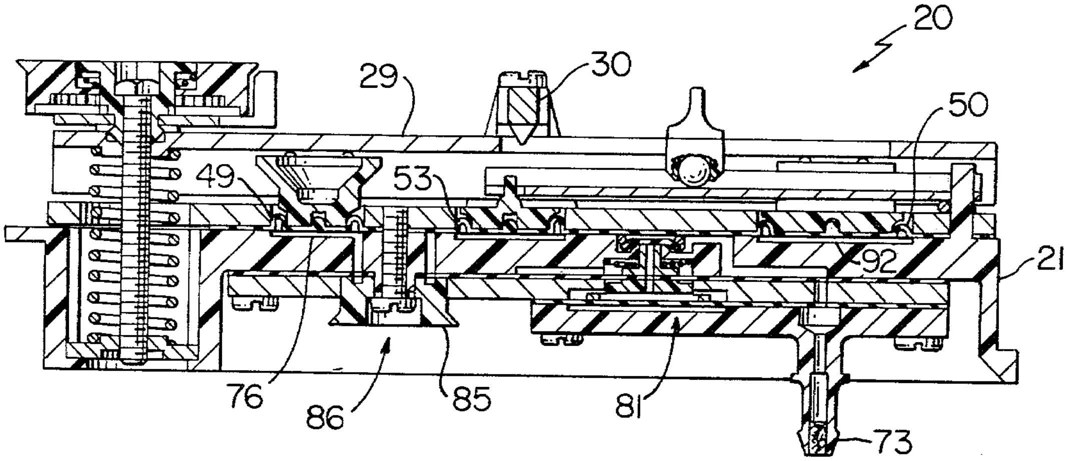
FIG. 11 is a cross-sectional view taken on line 11—11 of FIG. 8.

In particular, it can readily be seen in FIG. 10 that the fastening member 43 and its tubular sleeve 46 has been moved to the left hand end of the housing means 21 so as to fasten the flapper 41 with its end 40 to the left to be engaged by the threaded fastening member 38 that is now secured to the end 31 of the main lever 29. Similarly, the feedback lever 66 has been unhooked from the right hand post 68 of the housing means 21 and instead has its end 67 disposed on a left hand post 68′ whereby the end 65 of the feedback lever 66 can still be interconnected to the abutment means 64 for the feedback diaphragm 63.

Figure 8:
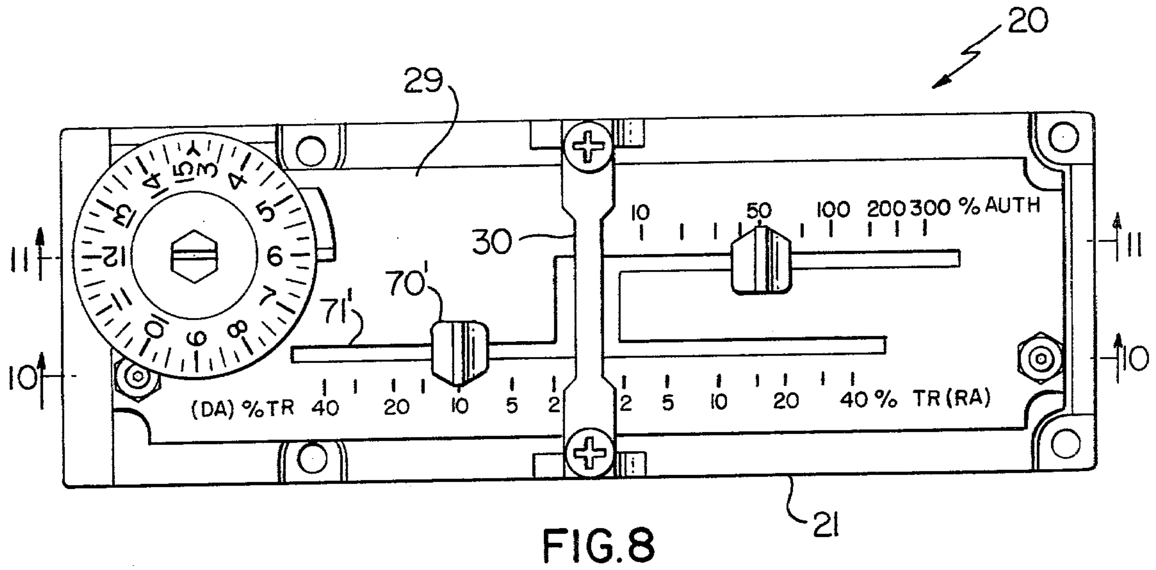
FIG. 8 is a view similar to FIG. 1 and illustrates the control device of FIG. 1 when set in its direct acting condition.
Figure 9:
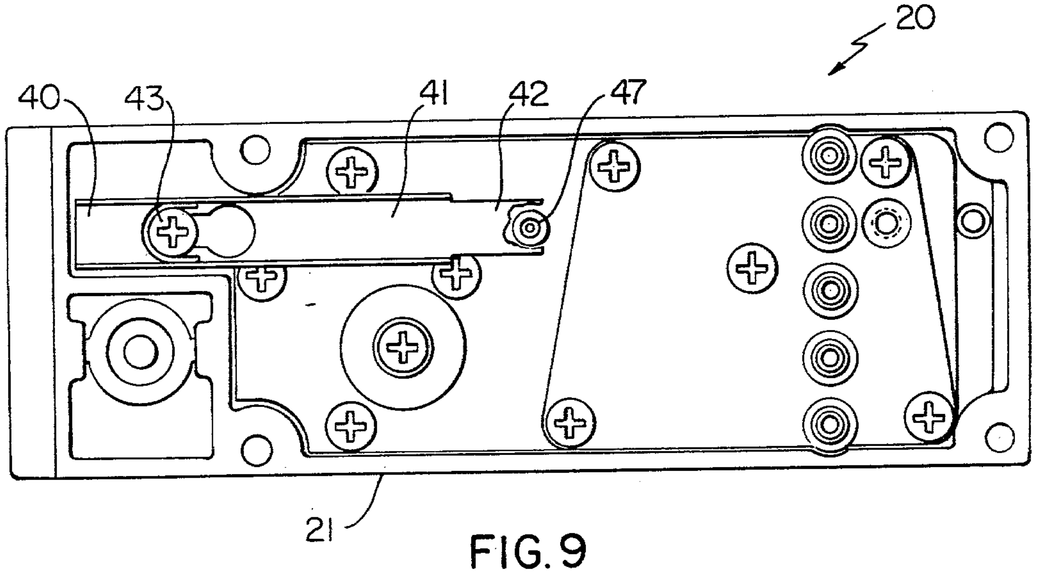
FIG. 9 is a bottom view of the control device of FIG. 8.

The adjustable abutment means 69, 70′ for the feedback lever 66 now acts on the main lever 29 to the left of the pivot means 30 as the slide member 70′ is now disposed in the left hand portion of the slot means 71′ of the main lever 29 in the manner illustrated in FIG. 8.

With the feedback lever 66 and flapper 41 now arranged in the manner illustrated in FIGS. 8–13, it can be seen that the respective ends 65 and 42 thereof are still positioned properly for the feedback diaphragm 63 and leakport means 47 since the feedback diaphragm 63, leakport means 47 and pivot means 30 for the main lever 29 still have their respective centerlines disposed in the same single vertical plane as previously described.

The operation of the control device 20 when set in the direct acting condition thereof as illustrated in FIGS. 8–13 will now be described.

Assuming that the control device 20 of FIGS. 8–13 is in balance, an increase in the signal force being directed to the signal chamber 92 causes the diaphragm 50 to move upwardly and cause the main lever 29 to pivot in a counterclockwise direction and thereby through the threaded stem 39 cause the flapper 41 to move the end 42 closer to the leakport 47 and thereby increase the value of the branch signal from the booster relay means 81. This increase in the force of the branch signal is directed to the feedback chamber 95 to cause the feedback diaphragm 63 to move upwardly and cause the feedback lever 66 to tend to move the main lever 29 in a clockwise direction about the pivot means 30 and thereby move the same back to the in balance condition thereof so that the flapper 41 has its end 42 moved away from the leakport means 47.

Conversely, a decrease in the signal force to the chamber 92, or an increase in the fluid force in the chamber 76, causes the diaphragm 50 or 49 to cause the main lever 29 to pivot in a clockwise direction and thereby increase the opening at the leakport means 47 to decrease the value of the branch signal directed out of the booster relay means 81. Such decrease in the value of the branch signal causes a decrease in the fluid force in the feedback chamber 95 so that the feedback diaphragm 63 moves downwardly in the drawings and thereby reduces its force acting on the main lever 29 to the left of the pivot means 30 so that the lever 29 will pivot back in a counterclockwise direction through the force of the diaphragm 53 and its lever 56.

Therefore, it can be seen that by merely changing the two pivot positions of the feedback lever 66 and flapper 41 so as both are disposed on one side of the main pivot means 30 for the main lever 29 or the other side thereof, the control device 20 of this invention can be changed from direct acting to reverse acting without requiring major repiping or reconstruction thereof as is required in prior known devices.

As previously stated, the diverter valve means 86 of this invention is normally set in the full line position illustrated in FIG. 6 when the control device 20 is being utilized either in the direct acting mode thereof or the reverse acting mode thereof as previously described.

However, by changing the diverting valve disc 85 to the dotted line position thereof illustrated in FIG. 6, such condition permits the control device 20 of this invention to be utilized as a control to the branch signal of another control unit intermediate thereto whether the other control unit is similar to the control unit 20 or other control device as desired.

In particular, the branch signal from that other control device is fed to the main connection 77 through the nipple means 73 in place of the normal main supply pressure source 101 and the normal main supply pressure 101 is interconnected to the nipple 70 in place of the fluid pressure signal source 101 so as to be directed by the groove 98 in the diverter valve disc 85 to the leakport means 47 and signal chamber of the booster relay 81 as illustrated by dotted lines in FIG. 6.

Thus, if the control device 20 of this invention is in the direct acting mode thereof with the diverter valve disc 85 set in the dotted line position of FIG. 6 and with the nipples 70 and 73 so connected, the receiver-controller 20 of this invention acts as a control whereby the branch signal from the controller 20 cannot exceed the branch signal of the control unit interconnected to the main portion 77 by the nipple 73. Since the control device 20 of this invention is designed to operate with a nominal main supply of approximately 20 psi, low supply pressure causes erratic operation thereof, i.e., the pressure drop across the flapper nozzle 47 and the restrictor 88 supplying the nozzle 47 are different at low supply than at a 20 psi supply so that all parts of the instrument must assume different positions to effect a balance thereof. Accordingly, it is desirable to provide a constant restricted main supply to the flapper nozzle 47 of the device 20 when it is used in such application. Therefore, it can be seen that the manual diverting valve means 86 is provided by this invention and when disposed in the dotted line position illustrated in FIG. 6, the diaphragm 49 has no access and the main 77 is only connected to the booster relay 81 and to the branch output 82 by the bleed line 83. In this manner a full pressure supply is provided for the leakport means 47 while the branch signal from the other control device is still handled by the booster relay 81 so that the branch output thereof will not exceed the value of the branch from such other control device.

Further, when the control device 20 is set in the reverse acting mode thereof and the diverter valve means 86 is turned to the dotted line position illustrated in FIG. 6, it has been found that the control device 20 can act as a control to a system wherein another control device of the receiver-controller type is utilized in combination therewith as previously described.

Therefore, it can be seen that this invention not only provides an improved control device, but also this invention provides an improved method of making a control device.

While the form and methods of this invention now preferred have been illustrated and described as required by the Patent Statute, it is to be understood that other forms and method steps can be utilized and still fall within the scope of the appended claims.

What is claimed is:

1. In a control device having a housing means provided with a main lever pivotally mounted thereto by a pivot means and being operatively associated with a flapper to move the same relative to a leakport means in relation to pivotal movement of said main lever, said device having a feedback diaphragm operatively associated with a feedback lever that is pivotally mounted to said housing means and operatively associated with said main lever to cause pivoting thereof upon pivoting movement of said feedback lever by said feedback diaphragm, the improvement wherein said control device has means for selectively changing said device to be either direct acting or reverse acting by changing the position of said feedback lever and said flapper and without changing the position of said feedback diaphragm and said leakport means, said means for changing said device comprising two different pivotally mounted position means in said housing means for said flapper and said feedback lever to effect the changing of said control device between said direct acting condition thereof and said reverse acting condition thereof.

2. A control device as set forth in claim 1 wherein said flapper and said feedback lever are both disposed on one side of said pivot means of said main lever by one of said pivotally mounted position means when said control device is direct acting and are both disposed on the other side of said pivot means of said main lever by the other of said pivotally mounted position means when said control device is reverse acting.

3. A control device as set forth in claim 1 wherein said pivot means, leakport means and feedback diaphragm respectively have centerlines that are all disposed substantially in the same plane.

4. A control device as set forth in claim 1 wherein said feedback lever is disposed intermediate said flapper and said main lever.

5. A control device as set forth in claim 4 wherein said main lever, said feedback lever and said flapper are all disposed substantially parallel to each other.

* * * * *